United States Patent
Choi et al.

(10) Patent No.: US 8,818,016 B2
(45) Date of Patent: Aug. 26, 2014

(54) APPARATUS FOR LOCALIZATION USING IMAGE AND RANGE DATA AND METHOD THEREOF

(75) Inventors: Hyun-Do Choi, Yongin-si (KR); Jun-Ho Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 13/043,046

(22) Filed: Mar. 8, 2011

(65) Prior Publication Data

US 2011/0299736 A1    Dec. 8, 2011

(30) Foreign Application Priority Data

Jun. 8, 2010   (KR) .......................... 10-2010-0054093

(51) Int. Cl.
*G06K 9/00*   (2006.01)

(52) U.S. Cl.
USPC ........................................................ 382/100

(58) Field of Classification Search
CPC ... G05D 1/0231; G05D 1/024; G05D 1/0251; G05D 1/0255; G05D 1/0257; G05D 2201/0218; G06K 9/00664
USPC .......................................... 382/100, 103, 106
See application file for complete search history.

(56) References Cited

U.S. PATENT DOCUMENTS

| | | | |
|---|---|---|---|
| 5,804,942 A | 9/1998 | Jeong | |
| 7,211,980 B1 * | 5/2007 | Bruemmer et al. | 318/587 |
| 7,991,550 B2 * | 8/2011 | Zeng | 701/301 |
| 8,340,852 B2 * | 12/2012 | Bageshwar et al. | 701/26 |
| 8,355,818 B2 * | 1/2013 | Nielsen et al. | 700/258 |
| 2004/0073360 A1 * | 4/2004 | Foxlin | 701/207 |
| 2006/0041331 A1 * | 2/2006 | Myeong et al. | 700/245 |

FOREIGN PATENT DOCUMENTS

| | | | |
|---|---|---|---|
| JP | 5-257530 A | | 10/1993 |
| JP | 6-138939 A | | 5/1994 |
| KR | 10-0156722 B1 | | 3/1997 |

OTHER PUBLICATIONS

Lim, J G. et. al., "A localization method using sensor fusion system", Jul. 2007, pp. 1767-1768.
Kim, H. D. et. al., "Simultaneous Localization and Mapping of Mobile Robot using Digital Magnetic Compass and Ultrasonic Sensors" Simultaneous Localization and Mapping, 2007, vol. 17, No. 4, pp. 506-510.

* cited by examiner

*Primary Examiner* — Tom Y Lu
(74) *Attorney, Agent, or Firm* — Sughrue Mion, PLLC

(57) ABSTRACT

A localization apparatus and method for localizing by use of image information and range data are provided. The localization apparatus includes an image sensor which captures an image and outputs image data, a range sensor which senses a distance and outputs a range sensing signal, an image feature point information processing unit which extracts image feature points from the sensed image and generates image feature point information about the extracted image feature points, a range feature point information processing unit which generates range feature point information about range feature points from the range sensing signal, and a state estimation unit which estimates a state variable including a position of the localization apparatus by using the image feature point information and the range feature point information as an observation value.

12 Claims, 7 Drawing Sheets

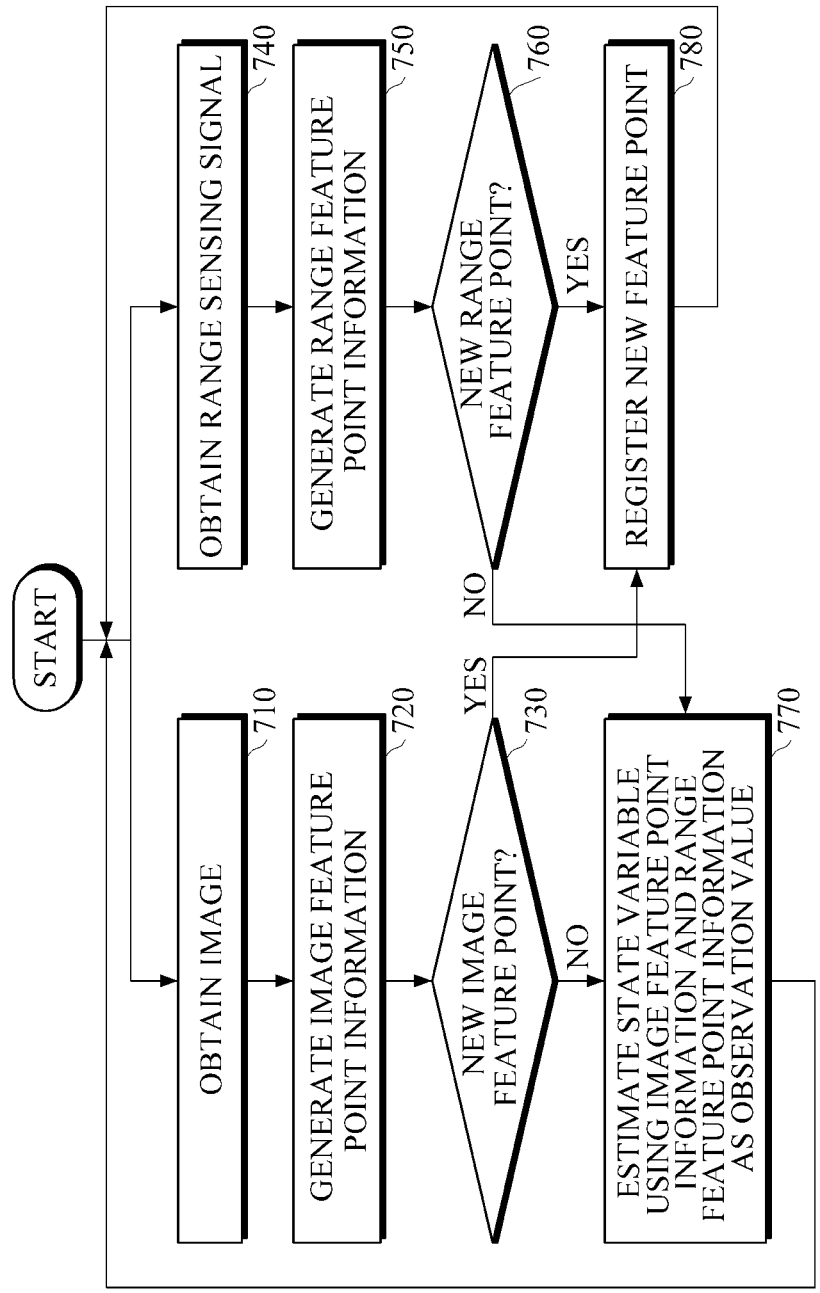

APPARATUS FOR LOCALIZATION USING IMAGE AND RANGE DATA AND METHOD THEREOF

CROSS-REFERENCE TO RELATED APPLICATION

This application claims the benefit under 35 U.S.C. §119(a) of Korean Patent Application No. 10-2010-0054093, filed on Jun. 8, 2010, the disclosure of which is incorporated by reference in its entirety for all purposes.

BACKGROUND

1. Field

The following description relates to an apparatus and method for localization, and more particularly, to an apparatus and method for localization using image information and range data.

2. Description of the Related Art

Simultaneous Localization And Mapping (SLAM) is an algorithm used by robots or vehicles to recognize their positions while at the same time building a map. An SLAM algorithm repeats a consecutive motion including building a map of an environment of a robot at a position (e.g., a predetermined position), and determining a new position of the robot based on the built map, thereby estimating the current position of the robot and the map of the environment of the robot. A bearing only (BO) sensor and a range only (RO) sensor may be used in performing such a SLAM algorithm.

The BO sensor recognizes image information that only indicates a direction of a landmark. The RO sensor recognizes signals that only indicate distance information with respect to a land mark, such as incoming signals received from a global positioning system (GPS), an ultra wideband (UWB), and Wireless Fidelity (Wi-Fi).

When performing localization by use of the information sensed from the RO sensor, a global position can be precisely localized, but a local position is less precisely localized. When performing localization by use of the information sensed from the BO sensor, a local position can be precisely localized but a global position is less precisely localized, due to accumulated error.

SUMMARY

One or more embodiments provide a localization apparatus and method capable of performing localization by simultaneously using a BO sensor and an RO sensor.

According to an aspect of an embodiment, there is provided a localization apparatus including an image sensor configured to sense an image, a range sensor configured to output range data, an image feature point information processing unit, a range feature point information processing unit and a state estimation unit. The image feature point information processing unit is configured to extract an image feature point from the sensed image and generate image feature point information about the extracted image feature point. The range feature point information processing unit is configured to generate range feature point information about a range feature point from the range sensing signal. The state estimation unit is configured to estimate a state variable including a position of the localization apparatus by using the image feature point information and the range feature point information as an observation value.

If the range feature point information includes a position of the range feature point, the state variable estimated by the state estimation unit further includes a posture of the localization apparatus and respective positions of a plurality of image feature points. If the range feature point information does not include a position of the range feature point, the state variable estimated by the state estimation unit further includes a posture of the localization apparatus, respective positions of a plurality of image feature points and the position of the range feature point.

The state estimation unit increases an uncertainty of the range feature point information in proportion to an average height of the image feature points and estimates the state variable by use of the image feature point information and the range feature point information, to which the increased uncertainty is applied. The state estimation unit increases an uncertainty of the range feature point information in proportion to an average angle of the image feature points with respect to a horizontal plane, and estimates the state variable by use of the image feature point information and the range feature point information, to which the increased uncertainty is applied.

The state estimation unit determines an uncertain part of the range feature point information by use of the image feature point information; if the uncertain part of the range feature point information is determined, the state estimation unit estimates the state variable in a condition that the uncertain part of the range feature point information is excluded from the observation value.

If a number of image feature points located at a region between the position of the localization apparatus and a position of the range feature point obtained from the range feature point information exceeds a value, the state estimation unit estimates the state variable in a condition that range feature point information corresponding to the position of the range feature point having the image feature points exceeding the value is excluded from the observation value.

The state estimation unit defines a plane (P) perpendicular to a line connecting the localization apparatus and the range feature point, projects the image feature points onto the plane (P), and defines an intersection point between the line connecting the localization apparatus and the range feature point and the plane (P), defines a circle having the intersection point as a center and having a radius of Rr. If a number of image feature points projected onto the defined circle exceeds a number, the state estimation unit estimates the state variable in a condition that the range feature point information is excluded from the observation value.

According to an aspect of another embodiment, there is provided a localization method including: obtaining an image and range data; extracting an image feature points from the image, and generating image feature point information about the image feature points; generating range feature point information about a range feature points from the range data; and estimating a state variable including a position of a localization apparatus by using the image feature point information and the range feature point information as an observation value Other aspects will become apparent to those skilled in the art from the following detailed description, which, taken in conjunction with the attached drawings, discloses exemplary embodiments of the invention.

BRIEF DESCRIPTION OF THE DRAWINGS

The above and/or other aspects will become apparent and more readily appreciated from the following description of embodiments, taken in conjunction with the accompanying drawings of which:

FIG. 7 is a flowchart illustrating an exemplary localization method according to an embodiment.

DETAILED DESCRIPTION

Figure 1:
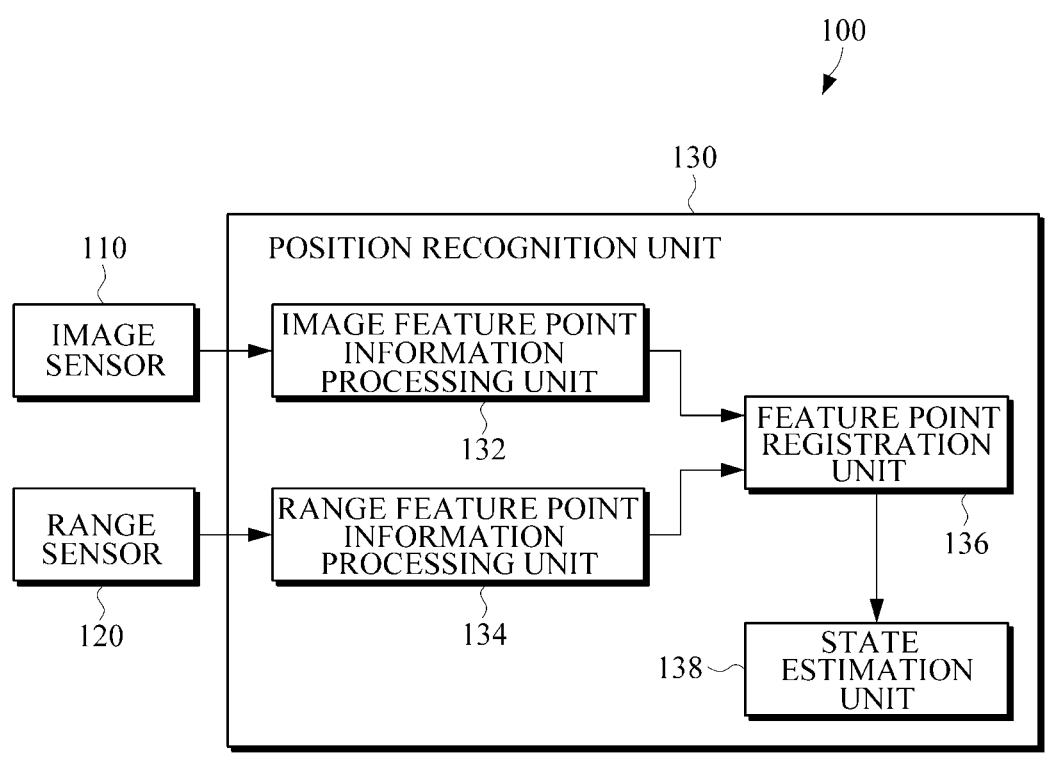
FIG. 1 is a block diagram illustrating an exemplary localization apparatus according to an embodiment.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness. Elements, features, and structures are denoted by the same reference numerals throughout the drawings and the detailed description. The size and proportions of some elements may be exaggerated in the drawings for clarity and convenience.

FIG. 1 is a block diagram illustrating an exemplary a localization apparatus according to an embodiment. A localization apparatus 100 includes an image sensor 110, a range sensor 120 and a position recognizing unit 130. The localization apparatus 100 may be implemented using a camera, a mobile robot and a terminal apparatus including a camera, but is not limited thereto; equivalent structures as understood by one skilled in the art may be substituted therefor. For example, but not by way of limitation, the image sensor 110 may correspond to a bearing only (BO) sensor and the range sensor 120 may correspond to a range only (RO) sensor.

The image sensor 110 captures an image and converts the captured image into a digital signal. The image sensor 110 may include a charge coupled device (CCD) module or a complimentary metal oxide semiconductor (CMOS) module, or other equivalent structure that performs the capturing and converting functions. The image sensor 110 obtains images varying according to a location shift. In a case where the localization apparatus 100 is a terminal apparatus including a camera, as a user moves holding the localization apparatus 100, the image sensor 110 may obtain images. In a case where the localization apparatus 100 is a mobile robot, images may be obtained according to the movement of the mobile robot.

The range sensor 120 senses a distance from a range feature point to output range data. The range sensor 120 may be implemented using at least one of a GPS receiver, a Wi-Fi receiver and a UWB receiver, but is not limited thereto.

The position recognizing unit 130 estimates a position and a direction angle based on a starting position and a starting direction angle of the localization apparatus 100. The position recognizing unit 130 extracts feature points from the outputs of each of the image sensor 110 and the range sensor 120, and recognizes the position based on the extracted feature points while generating a map.

The position recognizing unit 130 includes an image feature point information processing unit 132, a range feature point information processing unit 134, a feature point registration unit 136 and a state estimation unit 138.

The image feature point information processing unit 132 generates image feature point information, including image feature points and image feature point descriptors, from the image captured by the image sensor 110. The image feature point represents a point capable of specifying a shape, for example, an edge or a corner of an object. Such an image feature point is also referred to as a landmark used for building a feature point map. In addition, or alternatively, the image feature point may be a line or a point extracted from an outline of a closed region. The image feature point descriptor may be a local image for each image feature point, directivity information about the image, or vector information about the image that identifies the each image feature point.

The image feature information processing unit 132 may generate the image feature point and the image feature point descriptor by use of various feature point extraction algorithm such as a scale-invariant feature transform (SIFT), a maximally stable extremal region (MSER) scheme, or a Harries corner detector method, but is not limited thereto and other algorithms may be substituted therefor. The image feature point descriptor may be a local image for each image feature point, directivity information about the image or vector information about the image that identifies the each image feature point, but is not limited thereto.

The range feature point information processing unit 134 processes range sensing signals or range data output by the range sensor 120 to generate range feature point information about range feature points. The range feature point information includes a range feature point identifier (ID) and the distance between the range feature point and the localization apparatus 100. In addition, the range feature point information may further include position information about the range feature point.

The range feature point represents a GPS system, a Wi-Fi transmitter and a UWB transmitter that transmit a range sensing signal to the range sensor 120. The GPS system, the Wi-Fi transmitter and the UWB transmitter each have inherent identifiers (IDs), and transmit their own IDs in transmission signals.

A GPS signal includes information about a current position of the GPS system. Thus, if the range sensor 120 is a GPS receiver, the range feature point information processing unit 134 may obtain a range feature point identifier, a position of the range feature point and a distance between the range feature point and the localization apparatus 100. In general, if the range sensor 120 is a Wi-Fi receiver or a UWB receiver, the range feature point information processing unit 134 obtains only a range feature point identifier and a distance between the range feature point and the localization apparatus 100. However, if the range sensor 120 receives signals from a Wi-Fi transmitter or a UWB transmitter serving as a range feature point and capable of transmitting information about its own position, the range feature point information processing unit 134 may obtain the position of the range feature point as well.

The feature point registration unit 136 determines whether a newly input image feature point and a newly input range point are matched to a previously registered image feature point and a previously registered range feature point, respectively. The feature point registration unit 136 may, include a storage (not shown) to store the image feature point information and the range feature point information. The configuration of the storage is not limited thereto, and the storage may be provided at another position of the localization apparatus 100, or remotely therefrom.

The feature point registration unit 136 may determine whether a newly input image feature point is matched to a previously registered image feature point by comparing an image feature point descriptor included in newly input image feature point information with a previously registered image feature point descriptor. For example, but not by way of limitation, when the image feature descriptor is a local image, the matching between the image feature points is determined through a normalized cross correlation (NCC), a sum of squared difference (SSD), a sum of absolute differences (SAD) and a mean of absolute differences (MAD).

In addition, the feature point registration unit 136 may determine whether a newly input range feature point is matched to a previously registered range feature point by comparing a range feature point descriptor (ID) included in newly input range feature point information with a range feature point descriptor (ID) included in previously registered range feature point information. The feature point registration unit 136 transfers information about the newly input image feature point corresponding to the previously registered image feature point, and information about the newly input range feature point corresponding to the previously registered range feature point, to the state estimation unit 138.

The state estimation unit 138 estimates state variables including the position of the localization apparatus 100 by using the image feature point information and the range feature point information that are input from the feature point registration unit 136 as an integrated observation value in a position estimation algorithm. The state estimation unit 138 may estimate the position by use of a position estimation algorithm such as a particle filter, a Kalman filter, an information filter, or the like, but is not limited thereto, and other algorithms know in the art may also be applied. Hereinafter, it is assumed that the state estimation unit 138 performs position estimation according to the Kalman filter algorithm.

The Kalman filter is an algorithm for estimating an optimum state variable by repeating predication and update whenever observation is performed. A system equation of the state variable $x_k$ is defined as equation 1.

$$x_k = F_k x_{k-1} + B_k u_k + w_k \qquad \text{[Equation 1]}$$

Herein, $F_k$ is a state transition matrix for connecting a current state variable to a next state variable, $B_k$ is the control-input model which is applied to $u_k$, $u_k$ is an input variable, and $w_k$ is a system noise, and k is a count value denoting a timing point (e.g., a predetermined timing point) and increases by 1.

As a result of processing range data, if range feature point information including the position of the range feature point is generated, a state variable estimated by the state estimation unit 138 includes the position of the localization apparatus 100, the posture of the localization apparatus 100 and the positions of a plurality of feature points. As a result of processing range data, if range feature point information not including the position of a range feature point is generated, a state variable estimated by the state estimation unit 138 includes the position of the localization apparatus 100, the posture of the localization apparatus 100, the positions of a plurality of feature points and the position of the range feature point.

Figure 2:
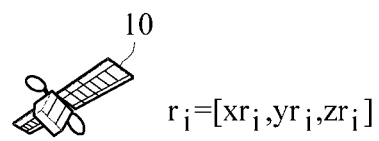
FIG. 2 is a diagram illustrating an image feature point and a range feature point used in the localization apparatus shown in FIG. 1.
Figure 2:
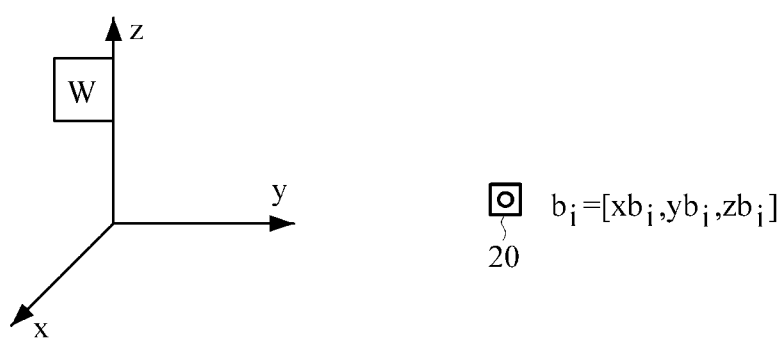
Figure 2:
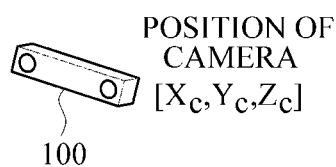

Hereinafter, the definition of the state variable $x_k$ and the observation vector $z_k$ will be explained with reference to FIG. 2. FIG. 2 is a diagram illustrating an image feature point and a range feature point used in the localization apparatus.

If the range sensor 120 receives a range sensing signal including the position of the range feature point, the position of the range feature point is included in the input vector $u_k$. Since a satellite generally transmits its own position, if a signal transmitter for transmitting a range sensing signal is a GPS 10 as shown in FIG. 2, the position of the range feature point is included in $u_k$. If the signal transmitter is a UWB transmitter or a Wi-Fi transmitter which transmits its own position through its own scheme, the range feature point is included in $u_k$.

$$x_k = [X_c Y_c Z_c \Phi_c \theta_c \psi_c x b_1 y b_1 z b_1 x b_2 y b_2 z b_2 \ldots x b_b y b_b z b_b]^T$$

$$u_k = [x r_1 y r_1 z r_1 \ldots x r_r y r_r z r_r]^T \qquad \text{[Equation 2]}$$

Herein, $X_c$, $Y_c$, $Z_c$ denote the position of the localization apparatus 100. The position of the localization apparatus 100 may represent the position of the image sensor 110. $\Phi_c$, $\theta_c$ and $\Psi_c$ denote the posture of the localization apparatus 100 or the image sensor 110. $xb_i$, $yb_i$ and $zb_i$ denote the position of an image feature point, such as the image feature point 20. $xr_i$, $yr_i$ and $zr_i$ denote the position of a range feature point, such as the range feature point 10.

If the UWB transmitter or the Wi-Fi transmitter does not transmit its own position, the position of the range feature point is included in the variable $x_k$ to be estimated, and $u_k$ is set to 0. This is expressed as equation 3.

$$x_k = [X_c Y_c Z_c \Phi_c \theta_c \psi_c x b_1 y b_1 z b_1 \ldots x b_b y b_b z b_b x r_1 y r_1 z r_1 \ldots x r_r y r_r z r_r]^T$$

$$u_k = 0 \qquad \text{[Equation 3]}$$

A measurement equation used to determine an observation vector is defined as equation 4.

$$z_k = H_k x_k + v_k \qquad \text{[Equation 4]}$$

Herein, $z_k$ is an observation vector, and $H_k$ is a matrix involving measurement at a corresponding time. $v_k$ is observed noise and represents the uncertainty of the measurement equation.

The observation vector consists of coordinates of a feature point within an image and range data as expressed in equation 5.

$$Z_k = [u_1 v_1 \ldots u_1 v_1 d_{a1} \ldots d_{an} d_{i1} \ldots d_{in}]^T \qquad \text{[Equation 5]}$$

Herein, $u_i$, and $v_i$ denotes a 2-dimensional position of an image feature point i in an obtained image, and $d_{a1} \ldots d_{an}$ $d_{i1} \ldots$ and $d_{in}$ denote range data.

The uncertainty of the measurement equation $v_k$ includes the uncertainty $V_{image}$ of image data and the uncertainty $V_{range}$ of range data. The uncertainty of the measurement equation is expressed as equation 6.

$$V_k = \begin{bmatrix} V_{image} \\ V_{range} \end{bmatrix} \qquad \text{[Equation 6]}$$

The uncertainty of the image data is determined by an algorithm that is used in feature point matching. The uncertainty of the range data is determined by the state variable $x_k$.

Referring again to FIG. 1, the uncertainty of the range feature point information may be determined according to characteristics of a space where the localization apparatus 100 is located. For example, if the localization apparatus 100 is located in an open area, errors do not occur in receiving GPS signals, so precise range data may be obtained. However, if the localization apparatus 100 is located in a closed area such as an urban area where GPS signals are reflected or blocked by object such as skyscrapers, obtained range feature point information may include significant errors. If the range feature point is located at a higher position, the range feature point information is more highly influenced by skyscrapers, so satellite information corresponding to the range feature point information includes higher uncertainty.

The state estimation unit 138 may increase the uncertainty of the range feature point information in proportion to the average height of the image feature points, in consideration that the uncertainty of an observed value is proportional to the average height of feature points, and accordingly estimate the state variable by use of image feature point information and the range feature point information having the increased uncertainty applied thereto. Alternatively, the state estimation unit 138 may increase the uncertainty of range feature point information in proportion to the average angle formed by image feature points with respect to a horizontal plane, and estimate the state variable by use of image feature point information and the range feature point information having the increased uncertainty applied thereto.

Alternatively, the state estimation unit 138 may determine an uncertain part of the range feature point information by use of image feature point information, and if the uncertain part of the range feature point information is determined, the state estimation unit 138 estimates the state variable in a condition that the uncertain part of the range feature point information is excluded from the observation value. For example, if the number of image feature points located at a region between the position of the localization apparatus 100 and the position of the range feature point obtained from the range feature point information exceeds a value (e.g., a critical value), the state estimation unit 138 estimates the state variable in a condition that range feature point information corresponding to the position having the image feature points exceeding the value is excluded from the observation value.

As described above, the image sensor and the range sensor are used together, and the image feature point information and the range feature point information each obtained from the image sensor and the range sensor are optimized in a position recognition framework, which may improve the reliability and precision in localization.

Figure 3:
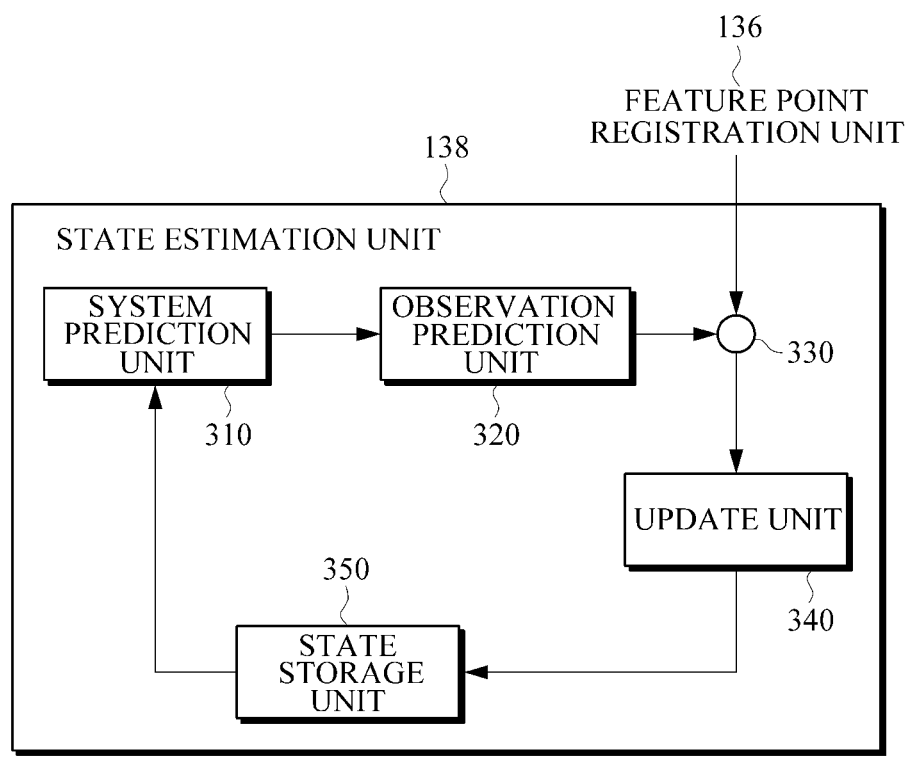
FIG. 3 is a diagram illustrating an exemplary state estimation unit included in the localization apparatus shown in FIG. 1 according to an embodiment.

FIG. 3 is a diagram illustrating an example of a configuration of a state estimation unit included in the localization apparatus shown in FIG. 1.

The state estimation unit 138 includes a system prediction unit 310, an observation prediction unit 320, a differential unit 330, an update unit 340 and a state storage unit 350.

The system prediction unit 310 outputs a state variable $x_k$ representing a current system estimation value by use of a previous state variable $x_{k-1|k-1}$ and an input variable $u_k$. The subscript n|m represents a state estimated at an n-timing point based on a value measured at an m-timing point.

The observation prediction unit 320 converts a state value $x_{k|k-1}$ to an observation vector $z_k$ representing an observation prediction value. Meanwhile, the feature point registration unit 136 inputs an actual observation value $z^*_k$ to the differential unit 330. The differential unit 330 provides the update unit 340 with a differential result of the observation vector $z_k$ and the actual observation value $z^*_k$. As described above, the uncertainty of the range feature point information may be determined by the characteristics of a space where the localization apparatus 100 is located. In consideration of the uncertainty of the range feature point information, the observation value $z^*_k$ is set.

The update unit 340 calculates a final state value $x_{k|k}$ by using Kalman gain such that the differential result is minimized. The calculated final state value $x_{k|k}$ is stored in the state storage unit 350. The final state value $x_{k|k}$ is used for estimating a state at a timing point k+1.

For example, but not by way of limitation, the observation prediction unit 320 may generate the observation vector $z_k$ by receiving position information about image feature points from the feature point registration unit 136, calculating the average height of the image feature points, and increasing the uncertainty of the range feature point information in proportion to the average height of the image feature points.

Alternatively, the observation prediction unit 320 may generate the observation vector $z_k$ by receiving position information about image feature points from the feature point registration unit 136, calculating the average angle of the image feature points with respect to a horizontal plane, and increasing the uncertainty of the range feature point information in proportion to the average angle of the image feature points.

Alternatively, the observation prediction unit 320 determines an uncertain part of the range feature point information by use of the image feature point information. If the uncertain part is determined, the observation prediction unit 320 generates the observation vector $z_k$ such that the uncertain part of the range feature point information is excluded from the observation vector $z_k$. In addition, the observation prediction unit 320 may perform control when the differential unit 330 receives an observation value $z^*_k$ excluding the range feature point information, which is determined to be uncertain when the position of the observation vector is estimated.

If a part of the range feature point information is determined to be uncertain, the state estimation unit 138 may predict the state variable in a condition that the part of the range feature point information determined to be uncertain during the position estimation is excluded. Although the above description assumes that the observation prediction unit 320 determines the uncertainty of the range feature point by use of the image feature points, the technology of determining the uncertainty of the range feature point is not limited thereto.

Figure 4:
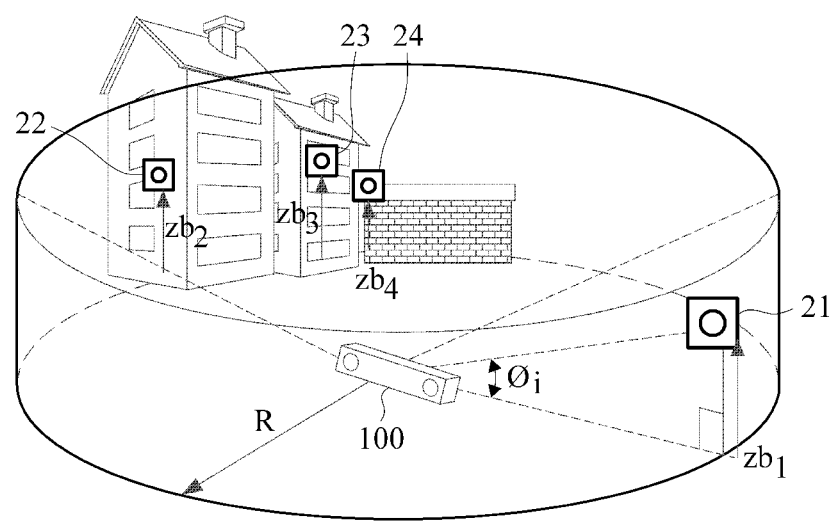
FIG. 4 is a diagram illustrating an exemplary method of determining uncertainty of the range feature point according to an embodiment.

FIG. 4 is a diagram illustrating an exemplary method of determining uncertainty of the range feature point according to an embodiment.

The state estimation unit (138, in FIG. 3) increases the uncertainty of the range feature point information in proportion to the average height of the image feature points and estimates the state variable by use of the image feature point information and the range feature point information, to which the increased uncertainty is applied. To this end, the state estimation unit 138 selects feature points existing at a distance of R from the localization apparatus 100 (or the image sensor). The state estimation unit 138 determines feature points satisfying equation 7 as the feature points existing at a distance of R from the localization apparatus 100 (or the image sensor).

$$\sqrt{(X_c - xb_i)^2 + (Y_c - yb_i)^2} < R \qquad [\text{Equation 7}]$$

$X_c$ and $Y_c$ represent the positions of a camera on X-axis and Y-axis, respectively. $xb_i$ and $yb_i$ represent the positions of an image feature point (i) on X-axis and Y-axis, respectively.

The state estimation unit 138 determines uncertainty of range feature point information in proportion to the average height of feature points existing at a distance of R from the localization apparatus 100 (or the image sensor). In particular, the state estimation unit 138 determines the uncertainty of range data of a range feature point which corresponds to a transmitter transmitting a range sensing signal to the localization apparatus 100. The uncertainty of the range data is expressed as $v_{range}=v_r[1\ 1\ \ldots\ 1]^T$. When image feature points are projected onto a cylindrical surface, the average height $v_r$ of the image feature points is expressed as equation 8.

$$v_r = k_z \frac{1}{n}\sum_i zb_i \qquad \text{[Equation 8]}$$

$zb_i$ represents the position of the image feature point (i) on the Z-axis, n represents the number of image feature points satisfying equation 7, and $k_z$ represents a proportionality constant varying depending on the type of the range sensor 120. For example, the average z position of image feature points 21, 22, 23 and 24 shown in FIG. 4 is calculated by equation 8.

In addition, the state estimation unit 138 may determine the uncertainty of the range feature point information by use of the angles of the image feature points and the camera with respect to the horizontal plane. As described above, range feature points satisfying equation 7 are determined as existing at a distance of R from the camera.

The state estimation unit 138 obtains a vector connecting the camera to each of the feature points existing at a distance R from the camera and obtains the average of angles ($\Phi_i$) formed between the vector and the horizontal line, or the average of tangent values at the angles. The uncertainty of range data is determined by the average of angles ($\Phi_i$) formed between a vector, which represents a distance between the localization apparatus 100 and a feature point corresponding to a transmitter transmitting a range sensing signal to the localization apparatus 110, and the horizontal line, or determined by the average of tangent values at the angles. This is calculated by equation 9.

$$v_r = k_\phi \frac{1}{n}\sum_i \tan\phi_i \qquad \text{[Equation 9]}$$
$$= k_\phi \frac{1}{n}\sum_i \frac{zb_i}{\sqrt{(X_c - xb_i)^2 + (Y_c - yb_i)^2}}$$

n represents the number of feature points satisfying equation 7, and $k_\phi$ represents the proportionality constant varying depending on the type of the range sensor.

Figure 5:
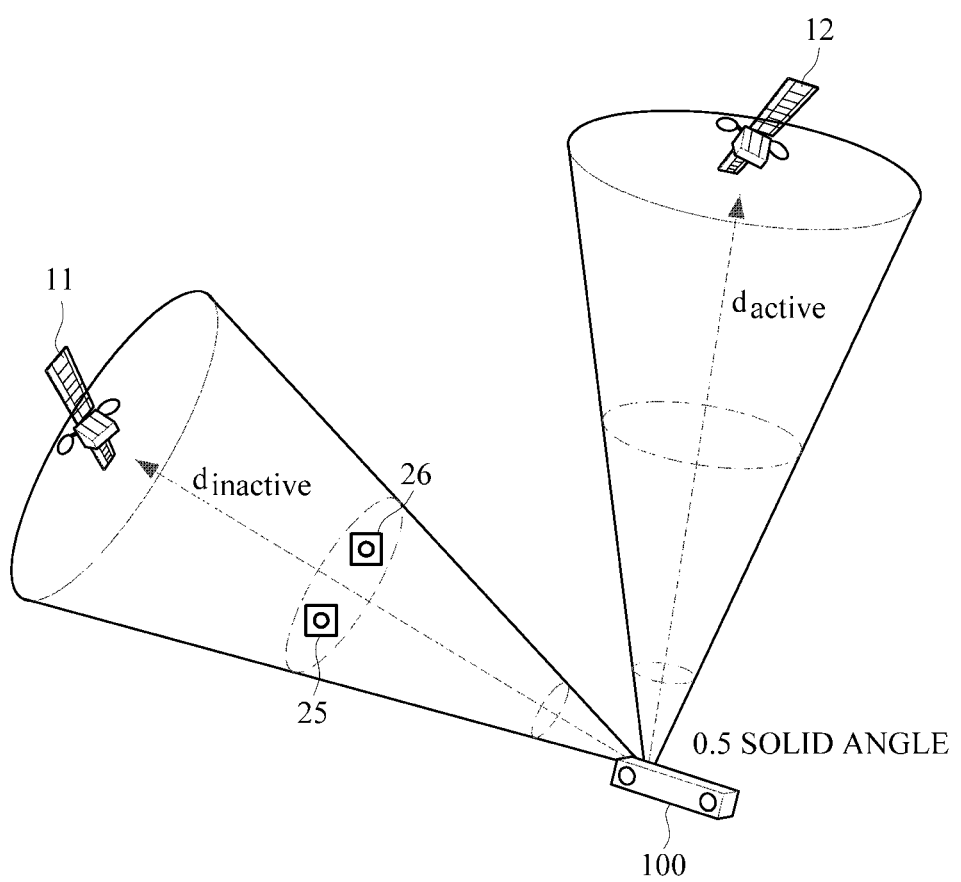
FIG. 5 is a schematic diagram illustrating an exemplary method of estimating a state variable by use of range feature points according to an embodiment.

FIG. 5 is a schematic diagram illustrating an exemplary method of estimating a state variable by use of some of range feature points according to an embodiment.

The state estimation unit 138 determines whether a part of the range feature point information is uncertain by use of image feature point information. If a part of the range feature point information is determined to be uncertain, the state estimation unit 138 estimates the state variable in a condition that the part of the range feature point information determined to be uncertain in the position estimation is excluded.

The state estimation unit 138 may determine the number of image feature points located at a region between the position of the localization apparatus 100 and the position of the range feature point obtained from the range feature point information. If the number of the image feature points located the region between the position of the localization apparatus 100 and the position of the range feature point obtained from the range feature point information exceeds a value (e.g., a critical value), the state estimation unit 138 may not use range feature point information corresponding to the position of the range feature point having the image feature points exceeding the value.

As an example, as shown in FIG. 5, in a case that the localization apparatus 100 receives range data from a first GPS satellite 11, since image feature points 25 and 26 exist at a region between the first GPS satellite 11 and the localization apparatus 100 in a range of a certain solid angle (e.g., 0.5 solid angle) having the localization apparatus 100 as a common point, the localization apparatus 100 may not use the received range data as a observation value. In a case that the localization apparatus 100 receives range data from a second GPS satellite 12, since image feature points do not exist at a region between the second GPS satellite 12 and the localization apparatus 100 in a range of a certain solid angle (e.g., 0.5 solid angle) having the localization apparatus 100 as a common point, the localization apparatus 100 may use the received range data as an observation value.

As described above, in a condition that a range data (e.g., a predetermined range data), which has high uncertainty, causing great error in position recognition is excluded, the state variable is estimated. Accordingly, the reliability and precision in localization are improved.

Figure 6:
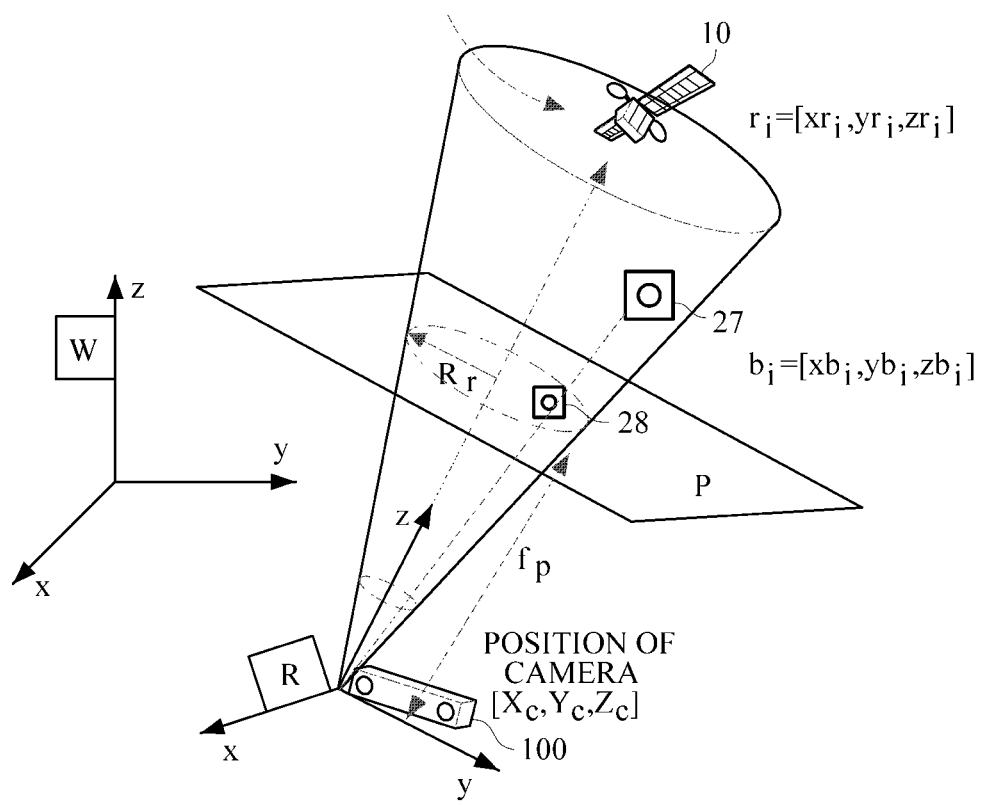
FIG. 6 is a detailed diagram illustrating the exemplary state variable estimating method shown in FIG. 5 according to an embodiment.

FIG. 6 is a detailed diagram illustrating the exemplary state variable estimating method shown in FIG. 5.

The state estimation unit 138 determines whether the number of image feature points located at a region between the position of the localization apparatus 100 and the position of the range feature point obtained from the range feature point information exceeds a value (e.g., a critical value), as follows.

The state estimation unit 138 defines a plane P perpendicular to a line connecting the localization apparatus 100 and the range feature point, projects image feature points onto the plane (P). The state estimation unit 138 defines an intersection point between the line connecting the localization apparatus 100 to the range feature point and the plane P, and defines a circle having the intersection point as a center and having a radius of Rr. The state estimation unit 138 calculates the number of image feature points projected on the defined circle, and if the number of image feature points projected onto the defined circle exceeds a number (e.g., a critical number), the state estimation unit 138 does not use corresponding range feature point information. That is, the state estimation unit 138 estimates the state variable in a condition where the corresponding range feature point information is excluded from the observation value.

To project the image feature points, which are defined on the world coordinate system, on the plane P, the state estimation unit 138 needs to transform the world coordinate system W to the local coordinate system R, having a vertical vector between the range feature point corresponding to the position of a satellite 10 and the localization apparatus 100 as a X-axis. A matrix $R^{RW}$ for coordinate transformation is expressed as equation 10, which is defined by coordinates $b_i$ of the image feature points and the position $x_c$ of the localization apparatus 100.

$$R^{RW} = R^{RW}(b_i, x_c) \qquad \text{[Equation 10]}$$

In addition, in expressing image feature points of an image on a local coordinate system, equation 11 is used.

$$h^R = R^{RW}(b_i - x_c) \qquad \text{[Equation 11]}$$

When a vector $h^R = [h_x^R\ h_y^R\ h_z^R]$ representing an image feature point with respect to the localization apparatus 100 is projected on the plane P, the position of a projected image feature point is calculated as equation 12.

$$[f_p h_x^R/h_z^R\ f_p h_y^R/h_z^R] \qquad \text{[Equation 12]}$$

Herein, $f_p$ represents the distance between the plane P and the localization apparatus 100. A condition required to locate the projected feature point on a circle having a radius of $R_r$ is calculated as equation 13.

$$(f_p h_x{}^R/h_z{}^R)^2 (f_p h_y{}^R/h_z{}^R)^2 \leq R^2 \qquad \text{[Equation 13]}$$

FIG. 7 is a flowchart illustrating an exemplary localization method according to an embodiment.

The localization apparatus obtains an image, e.g., by use of the image sensor (710). The localization apparatus generates image feature point information (720).

The localization apparatus obtains range sensing signals, e.g., by use of the range sensor (740). The localization apparatus generates range feature point information (750).

The localization apparatus determines whether a newly input image feature point is matched to a previously registered image feature point (730), and whether a newly input range feature point is matched to a previously registered range feature point (760).

Image feature point information matched to the previously registered image feature point and range feature point information matched to the previously registered range feature point are used as an observation value to estimate the position of the localization apparatus (770). The localization apparatus may estimates a state variable including the position of the localization apparatus by use of various position recognition algorithms, such as a Kalman filter and a particle filter. After the position estimation (770), the obtaining of the image 710 and the obtaining of the range sensing signals 740 start again.

If a newly input range feature point is not a previously registered range feature point, the localization apparatus registers range feature point information corresponding to the corresponding range feature point as new range feature point information (780). In addition, if an image feature point extracted through image feature point information processing is a new image feature point not matched to the previous image feature point, the localization apparatus registers the new image feature point (780). After the registration of the image feature point and the range feature point (780), the obtaining of the image 710 and the obtaining of the range sensing signals 740 start again.

The above-described embodiments can also be embodied as computer readable codes which are stored on a computer readable recording medium (for example, non-transitory, or transitory) and executed by a computer or processor. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the embodiments can be easily construed by programmers skilled in the art to which the disclosure pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A localization apparatus comprising:
   an image sensor which captures an image and outputs image data;
   a range sensor which receives a range sensing signal transmitted from a transmitter which is located in a range feature point and outputs the received range sensing signal;
   an image feature point information processing unit configured to extract image feature points from the image data output by the image sensor and generates image feature point information about the extracted image feature points;
   a range feature point information processing unit which generates range feature point information about the range feature point from the range sensing signal; and
   a state estimation unit which estimates a state variable comprising a position of the localization apparatus by using the image feature point information and the range feature point information as an observation value,
   wherein the state estimation unit increases an uncertainty of the range feature point information in proportion to an average height of the image feature points and estimates the state variable by use of the image feature point information and the range feature point information, to which the increased uncertainty is applied.

2. The localization apparatus of claim 1, wherein if the range feature point information comprises a position of the range feature point, the state variable further comprises a posture of the localization apparatus and positions of a plurality of image feature points.

3. The localization apparatus of claim 1, wherein if the range feature point information does not comprise a position of the range feature point, the state variable further comprises a posture of the localization apparatus, position of a plurality of image feature points and the position of the range feature point.

4. The localization apparatus of claim 1, wherein the state estimation unit increases an uncertainty of the range feature point information in proportion to an average angle of the image feature points with respect to a horizontal plane and estimates the state variable by use of the image feature point information and the range feature point information, to which the increased uncertainty is applied.

5. A localization apparatus comprising:
   an image sensor which captures an image and outputs image data;
   a range sensor which receives a range sensing signal transmitted from a transmitter which is located in a range feature point and outputs the received range sensing signal;
   an image feature point information processing unit configured to extract image feature points from the image data output by the image sensor and generates image feature point information about the extracted image feature points;
   a range feature point information processing unit which generates range feature point information about the range feature point from the range sensing signal; and
   a state estimation unit which estimates a state variable comprising a position of the localization apparatus by using the image feature point information and the range feature point information as an observation value,
   wherein the state estimation unit determines an uncertain part of the range feature point information by use of the image feature point information, and if the uncertain part of the range feature point information is determined, the state estimation unit estimates the state variable in a condition that the uncertain part of the range feature point information is excluded from the observation value.

6. The localization apparatus of claim 5, wherein, if the number of the image feature points located at a region between the position of the localization apparatus and a position of the range feature point obtained from the range feature point information exceeds a value, the state estimation unit estimates the state variable in a condition that range feature point information corresponding to the position of the range feature point having the image feature points exceeding the value is excluded from the observation value.

7. The localization apparatus of claim 6, wherein the state estimation unit defines a plane perpendicular to a line connecting the localization apparatus and the range feature point, projects the image feature points onto the plane, defines an intersection point between the line connecting the localization apparatus and the range feature point and the plane, defines a circle having the intersection point as a center and having a radius, and if the number of the image feature points projected onto the defined circle exceeds a number, the state estimation unit estimates the state variable in a condition that the range feature point information is excluded from the observation value.

8. A localization method of a localization apparatus, the localization method comprising:
    obtaining image data by an image sensor and range data by a range sensor;
    extracting an image feature point from the image data;
    generating image feature point information about the image feature point;
    generating range feature point information about a range feature point from the range data; and
    estimating a state variable comprising a position of a localization apparatus by using the image feature point information and the range feature point information as an observation value,
    wherein the range data is received from a transmitter which is located in the range feature point, and
    wherein the estimating the state variable comprises:
    increasing uncertainty of the range feature point information in proportion to at least one of an average height of the image feature point and an average angle of the image feature points with respect to a horizontal plane; and
    estimating the state variable by use of the image feature information and range feature point information, to which the increased uncertainty is applied.

9. The localization method of claim 8, wherein if the range feature point information comprises a position of the range feature point, the state variable further comprises a posture of the localization apparatus and positions of a plurality of image feature points.

10. The localization method of claim 8, wherein if the range feature point information does not comprise a position of the range feature point, the state variable comprises a posture of the localization apparatus, position of a plurality of image feature point and the position of the range feature point.

11. A localization method of a localization apparatus, the localization method comprising:
    obtaining image data by an image sensor and range data by a range sensor;
    extracting an image feature point from the image data;
    generating image feature point information about the image feature point;
    generating range feature point information about a range feature point from the range data; and
    estimating a state variable comprising a position of a localization apparatus by using the image feature point information and the range feature point information as an observation value,
    wherein the range data is received from a transmitter which is located in the range feature point, and
    wherein the estimating the state variable further comprises, if the number of the image feature points located at a region between the position of the localization apparatus and a position of the range feature point obtained from the range feature point information exceeds a value, excluding range feature point information corresponding to the position of the range feature point having the image feature point exceeding the value, from the observation value.

12. The localization method of claim 11, wherein the excluding the range feature point information from the observation value comprises:
    defining a plane perpendicular to a line connecting the localization apparatus and the range feature point;
    projecting the image feature point onto the plane;
    defining an intersection point between the line connecting the localization apparatus and the range feature point and the plane;
    defining a circle having the intersection point as a center and having a radius of Rr; and
    if a number of the image feature points projected onto the defined circle exceeds a number, excluding the range feature point information from the observation value.

* * * * *